Figure 1:
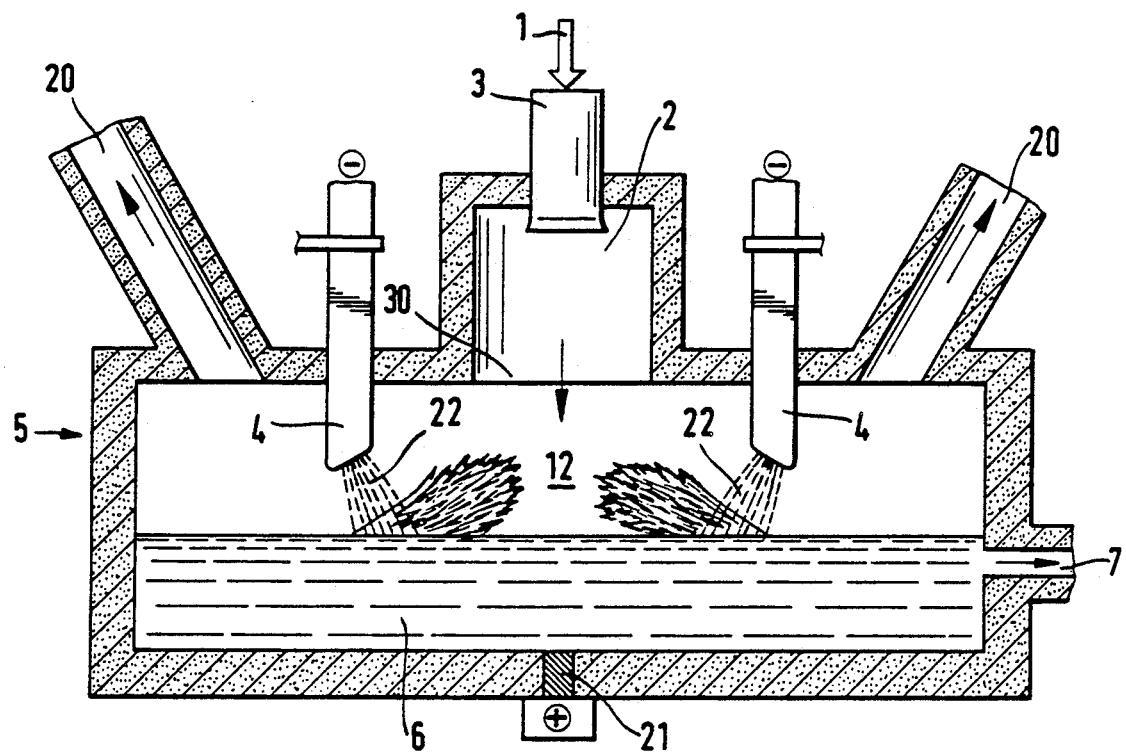

United States Patent [19]

Hakulin et al.

[11] Patent Number: 4,995,051

[45] Date of Patent: Feb. 19, 1991

[54] SMELTING FURNACE AND METHOD FOR FEEDING MATERIAL TO BE PROCESSED THEREIN

[75] Inventors: Nils H. Hakulin, Espoo, Finland; Risto M. Heikkilä, Haparanda, Sweden; Matti E. Honkaniemi, Tonrio, Finland; Helge J. Krogerus; Launo L. Lilja, both of Pori, Finland

[73] Assignee: Outokumpu Oy, Helsinki, Finland

[21] Appl. No.: 313,960

[22] Filed: Feb. 21, 1989

[30] Foreign Application Priority Data

Feb. 22, 1988 [FI] Finland ................................ 880819

[51] Int. Cl.$^5$ .............................................. F27B 3/18
[52] U.S. Cl. ...................................................... 373/81
[58] Field of Search .................... 373/62, 63, 81, 108, 373/79, 80, 72; 414/156, 147, 160, 162, 155; 266/184

[56] References Cited

U.S. PATENT DOCUMENTS 1,427,436  8/1922  Bradley ................................ 373/63
4,079,185  3/1978  Collin ................................... 373/81
4,385,918  5/1983  Dunn et al. ............................ 65/27

Primary Examiner—Roy N. Envall, Jr.
Attorney, Agent, or Firm—Dellett, Smith-Hill and Bedell

[57] ABSTRACT

The invention relates to a smelting furnace, particularly a D.C. arc furnace, suited for the treatment of finely-divided material, which comprises at least three electrodes suspended through the roof in order to create the electric arc. The process material is fed in through at least one feed gate (30) arranged inside the circle orbit formed by the electrodes (4, 16, 26) suspended through the furnace roof, which feed gate (30) is provided with auxiliary members in order to create an even supply of the material into the furnace. In order to discharge the gases created in the process, there is provided at least one outlet (20) outside the circle orbit formed by the electrodes (4, 16, 26).

The invention also relates to a method for feeding finely divided material into the smelting furnace. According to this method, the material is fed through the feed gate (30) in suspension, either vertically or tangentially.

15 Claims, 2 Drawing Sheets

SMELTING FURNACE AND METHOD FOR FEEDING MATERIAL TO BE PROCESSED THEREIN

The present invention relates to a smelting furnace, advantageously a D.C. furnace, and to a method for feeding the processable material therein, when oxide-containing materials, such as ore concentrates or intermediate oxide products, are processed into a product suitable for further refining.

Steel production from crude iron, as well as the majority of reduction processes carried out in submerged arc furnaces, are based on the fact that the material is in the form of lump ore, sinter or sintered pellets, and that generally the only acceptable reducing agent is coke.

One restriction in the above mentioned production methods, irrespective of whether the reduction and smelting are carried out in a blast furnace or in a submerged arc furnace, is that finely-divided ore cannot be used without expensive agglomeration. Another restriction is that the required reducing agent is mainly high-quality metallurgical coke, the production whereof brings about environmental problems. The third restriction for submerged arc furnaces is that a prerequisite for economical smelting is a high electric resistance of the slag, which generally is in contradiction with the metallurgical requirements.

Consequently, it has long been attempted to develop new smelting processes without these restrictions. Among the new methods, some are based on the smelting of finely-divided ore in an electric furnace, where the smelting energy is created by means of a plasma arc or a D.C. arc, or where the electric current heats the slag through resistance losses. These new methods often include the preheating and preliminary reduction of the finely-divided ore.

In plasma arc process, such as:
the Freital process (Kepplinger L.-W., Müeller H., Koch E., Bericht über plasmametallurgische Entwicklungen bei der Voest-Alpine, 19. Metallurgischer Seminar der GDMB; Elektroofentechnik in der Matallurgie, 1987),
EPP process (Heanley C.P., Cowx P. M., The smelting of Ferrous Ores Using a Plasma Furnace, Electric Furnace Conference Proceedings, ISS-AIME, Vol. 40, 1982, pp. 257–265),
the SSP process (Moore J. J., Reid K. J., Industrial Plasma for Steelmaking, Electric Furnace Conference Proceedings, ISS-AIME, Vol. 40, 1982, pp. 231–238,
the Plasmacan process (CA Patent No. 1,173,7481) and
the University of Toronto process (Sommerville I. D., McLean A., Alcock C. B., Smelting and Refining of Ferroalloys in a Plasma Reactor, Electric Furnace Conference Proceedings, ISS-AIME, Vol. 41, 1983),
the prevailing problem is that too large a part of the plasma arc radiation goes to the heating of the furnace lining instead of heating the molten as well as the supplied raw material. In order to alleviate the problem, the raw material is fed as a curtain around the electric arc. Because the curtain remains thin, the solution cannot be considered optimal.

When using a D.C. furnace, as in the ASEA application (SE patent application No. 8600939-6) and in the ELRED process (Collin P. H., Sticker H., The ELRED Process, Iron and Steel Engineer, Vol. 57, 3, 1980, pp. 43–45), the raw material is fed in through a hole provided in the electrode. In order to remain electroconductive, the electric arc requires a high temperature, and therefore it may also in this process heat the lining too much, or then the stability of the electric arc is decreased, so that the power efficiency remains low.

The IRSID has, together with the CLESIM and Jeumont-Schneider, built a D.C. furnace with three electrodes serving as cathodes. Now the electric arcs, owing to the magnetic field, are bent inwards. In practice it has been proved that the radiation of the electric arc to the walls is extremely low when compared to the electric arc radiation of an A.C. furnace.

Finely-divided metal oxide and/or metal sulphide containing material for producing molten metal can also be treated according to the methods described in the FI patent Nos. 66433 and 66434. Accordingly, the metal oxide containing material, when falling through a shaft furnace, is smelted by bringing it into contact with the hot gases created by means of burning, in which case some carbon-containing reducing agent is simultaneously fed into the shaft furnace. The said hot gases are made to proceed upwards through the shaft, and the molten, metal oxide containing material located in the bottom part of the shaft, is converted, by means of partial reduction in contact with the supplied reducing agent, to a pre-reduced product. The metal oxide containing material under treatment is, together with the rest of the solid material, fed into the shaft furnace through burners, which are directed obliquely downwards. By means of the downwards inclined burners, the solid material is directed towards the center of the shaft furnace. Consequently, in the center of the shaft furnace there is formed a thick material curtain, where the heating of the innermost particles is not likely to achieve the same conditions as that of the outer particles, in which case the energy utilization ends up to be uneven and poor.

The purpose of the present invention is to eliminate some of the drawbacks of the prior art and to realize a smelting furnace which could make more efficient use of the electric energy fed into a D.C. arc furnace, as well as to achieve a feeding method for the material to be treated in a smelting furnace. The essential novel features of the invention are apparent from the appended patent claims.

According to the invention, the finely-divided material is fed into a D.C. arc furnace through at least one feed gate provided in the furnace roof, in the area in between the electrodes, which feed gate is advantageously connectable to a preheating unit of the material and/or to a concentrate divider. These members advantageously form an essentially closed system with the gas space of the smelting furnace, and thus create an essentially even material supply into the smelting furnace. Thus the electric energy required in the treatment can remarkably better than in the prior art, be directed to the molten material and to the material to be fed in.

The invention can advantageously be applied to a D.C. arc furnace, where at least three electrode serving as cathodes and suspended through the roof, are located on a circle orbit, essentially symmetrically in the center of the furnace. As for the anode, it is placed in the furnace bottom lining so that it is in contact with the melt present in the furnace.

When using constructions like the above described D.C. arc furnace in the realization of the invention, the magnetic field formed by the electrode currents bends the electric arcs inwards. The inwardly bending of the electric arcs can further be enhanced by placing the cathode electrodes in an inclined position with respect to the vertical plane. The angle between the electrodes and the vertical plane is advantageously within the range of 1–5 degrees. Thus the major part of the energy created by the electric arcs that is not transferred into the molten bath is directed into the center of the furnace, gently upwards as for the height. Because the material to be treated according to the invention is also fed into the center of the circle formed by the electrodes placed in the furnace, the energy created by the electric arcs can advantageously be utilized in smelting of falling particles.

In a preferred embodiment of the invention, in the center of the circle formed by the electrodes there is advantageously created a section of the electric furnace roof which is essentially higher than the rest of the roof, which section serves as a preheating shaft of the finely-divided material, in order to preheat the particles present in the material before they are brought within the effective range of the energy, which in the furnace of the present invention is advantageously created by the electric arcs.

The exhaust gases formed in the treatment of the material are discharged from the smelting furnace of the invention through outlets provided outside the circle formed by the electrodes. According to the invention, it is also possible to return part of the exhaust gases to the preheating unit, i.e. the preheating shaft, located in the center of the smelting furnace, in order to boost the heating of the particles of the supplied material. From the preheating shaft, the recirculated exhaust gases can be discharged before they enter the smelting zone proper of the smelting furnace, but they can also be removed, together with the rest of the gases created in the smelting process, through the gas outlets provided outside the circle formed by the electrodes.

Figure 2:
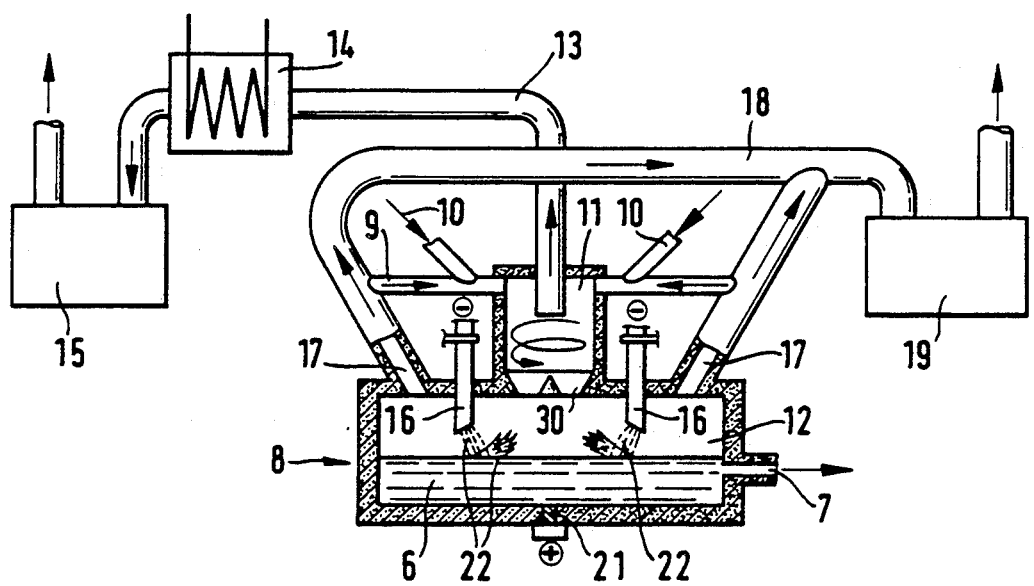
Figure 3:
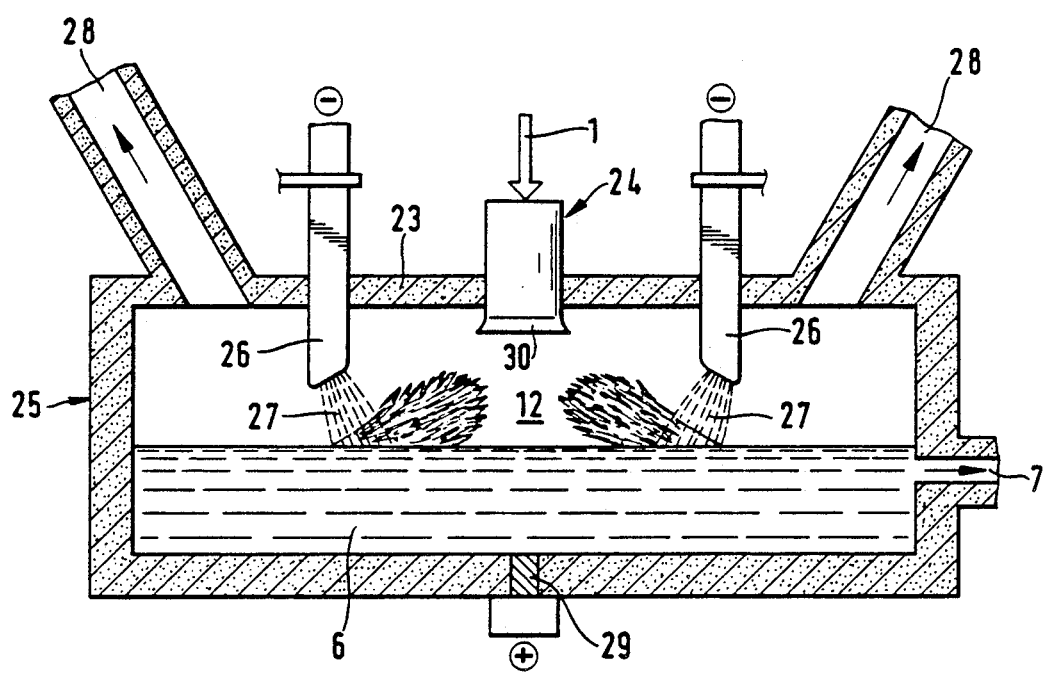

The invention is explained in more detail below with reference to the appended drawings, where FIG. 1 is a schematical illustration of a preferred embodiment of the invention, seen from the side, FIG. 2 is a schematical illustration of another preferred embodiment of the invention, seen from the side, and FIG. 3 is a schematical illustration of a preferred auxiliary embodiment of the invention, seen from the side.

According to FIG. 1, the mixture 1 of finely-divided concentrate, reducing agent and flux is fed into the preheating shaft 2 through the concentrate divider 3. By means of the divider 3, the essentially vertically fed solid material is divided into essentially separate particles and distributed in an even suspension advantageously over the whole cross-sectional area of the preheating shaft. Thus the preheating shaft receives an advantageous thin concentrate suspension, where the heating of the particles takes place in an essentially even fashion. The preheating shaft 2 communicates with the smelting zone 12 through a feed gate 30. The cathode electrodes 4 required for smelting the solid material are placed around the preheating shaft 2 so that the magnetic field formed by the electrode currents bends the electric arcs inwards. As for the anode electrode 21, it is placed in the bottom lining of the electric furnace so that it is in contact with the melt 6. Thus that part of the energy created by the electric arcs 22 which is not directly transferred to the melt 6 on the bottom of the smelting furnace 5, is absorbed into the process material 1 advantageously falling from the preheating shaft 2. The exhaust gases created in the treatment of the material are discharged from the smelting furnace 5 through the gas outlets 20 located outside the electrode circle in the smelting furnace roof, and are further directed into the gas treatment facilities. As for the treated material, it is advantageously tapped through the outlet 7 provided at the side of the smelting furnace 5.

In the preferred embodiment of FIG. 2, a portion of the exhaust gas from the smelting furnace is recirculated into the preheating shaft 11. The finely-divided concentrate, together with the reducing agent and flux, is added to the recirculated flow of exhaust gas in the joint 9. In this fashion, the exhaust gas is used for preheating the concentrate. When necessary, the oxygen amount required for burning is added to the suspension formed by the exhaust gases and the treated material via the joint 10. The oxygen can be supplied either as pure oxygen or as oxygen-enriched air. The suspension of gas and solid process material is fed tangentially into the preheating shaft 11 of the smelting furnace. Then the gas used for preheating the solid material can be discharged, by applying the cyclone principle, from the preheating shaft 11 before the preheated material enters the smelting zone proper 12 of the smelting furnace. The gas needed for preheating the solid material is removed from the preheating shaft 11 through the outlet joint 13 provided in the middle part of the preheating shaft 11. The gases discharged through the joint 13 are further directed into a gas treatment unit, such as a waste heat boiler 14, in order to separate the solid particles contained therein, and further for instance to a gas scrubber 15.

In order to improve the separation of the solid material from the gas used for preheating it, the preheating shaft 11 is advantageously downwards narrowing in shape. Owing to the downwards narrowing preheating shaft 11, the solid material falling into the smelting zone 12 of the smelting furnace is advantageously directed essentially near to the center of the smelting furnace 8.

The cathode electrodes 16 of the smelting furnace 8 are located, as in the embodiment of FIG. 1, around the preheating shaft 11 so that the magnetic field formed by the electrode currents bends the electric arcs inwards, i.e. towards the center of the smelting furnace. Thus the preheated solid material falling from the preheating shaft 11 is directed to use that part of the energy developed by the electric arcs that is not directly transferred to the melt present in the smelting furnace.

The gases created in the smelting zone 12 of the smelting furnace are discharged through the gas outlets 17 provided outside the electrode circle of the smelting furnace roof. The exhaust gases that are not recirculated into the preheating shaft 11 are directed, via the outlet joints 18, to a gas treatment unit and then to further processing.

In FIG. 3, the concentrate divider 24 is installed through the center of the roof 23 and feeds the mixture of the finely-divided material to be supplied in the furnace, the flux and the reducing agent directly into the gas space of the smelting furnace 25 without preheating. Thus, the outlet of the concentrate divider 24 constitutes the feed gate 30. The suspension formed by the feed material advantageously meets the inwards bent electric arcs 27, created by the cathode electrodes 26, essentially immediately after feeding through the concentrate divider. The embodiment of FIG. 3 is particularly advantageous for easily inflammable materials.

The exhaust gases created in the reduction are discharged from the smelting furnace 25 through the gas outlets 28, provided outside the circle formed in the roof by the cathode electrodes 26, to be further processed. In the preferred embodiment of FIG. 3, the employed bottom electrode, the anode 29, corresponds to the electrode used in the embodiments of FIGS. 1 and 2.

Obviously the smelting furnace and feeding method of the present invention are not necessarily limited to the above described embodiments only, but the invention can be even largely modified within the scale of the appended patent claims.

EXAMPLE

The smelting furnace and feeding method of the smelting furnace according to the present invention was applied to a concentrate containing 42.7% $Cr_2O_3$, 22.2% FeO, 3.5% $Fe_2O_3$, 4.1% $SiO_2$, 13.1% $Al_2O_3$, 10.2% MgO and 0.7% CaO (percentages by weight). In order to realize the smelting process, into the smelting furnace there was fed 20.54 t concentrate, a total of 4.2 t dolomite and quartzite serving as flux, as well as 4.3 t coke serving as the reducing agent. The solid materials were first fed, according to FIG. 2, through the recirculation joint of the smelting furnace, tangentially into the preheating shaft by applying the cyclone principle.

The purpose of the preheating shaft was to heat the material to be smelted in the smelting furnace proper up to the temperature of 700° C. Now 4420 $Nm^3$ oxygen-containing gas, i.e. combustion air, was conducted into the preheating shaft. In connection with the heating, 7185 $Nm^3$ gas was discharged from the preheating shaft to be processed further.

The preheated material was conducted, by applying the cyclone principle, to the smelting furnace where during the smelting process there were created two molten phases: slag, 10.49 t altogether, and ferro-chrome, 10.0 t altogether. There was simultaneously created a total of 6610 $Nm^3$ exhaust gases, 2145 $Nm^3$ whereof was recirculated back to the preheating shaft, to the heating of cold solid material.

The ferro-chrome product obtained from the smelting furnace contained 52.5% chromium, 37.0% iron, 3.0% silicon and 7.5% carbon (percentages by weight). The analysis of the received slag was 6.4% chromium, 3.4% iron, 29.5% silicon oxide, 26.5% aluminium oxide, 22.9% magnesium oxide and 5.9% calcium oxide (percentages by weight). Thus the obtained yield of the supplied chromium in the ferro-chrome product was 87.8%, the yield of the supplied iron was 90.2%, and the energy consumption of the smelting furnace was 31.7 MWh.

We claim:

1. A smelting furnace comprising:
   wall means bounding a smelting zone, said wall means including a floor and a roof, the roof defining a feed gate for introducing feed material into the smelting zone, the feed gate being at substantially the same height as the roof, or being higher than the roof, and the roof also defining at least one discharge opening for discharging gases from the smelting zone,
   at least three cathodes extending through the roof of the wall means, the cathodes being disposed at locations spaced apart around a circle, the feed gate being inside said circle and the discharge opening being outside said circle,
   an anode at the floor of the wall means, and
   supply means for providing a supply of feed material to the feed gate in an even suspension over the cross-sectional area of the gate.

2. A smelting furnace according to claim 1, comprising a preheating unit connected to the feed gate, whereby feed material being introduced into the smelting zone is preheated before it reaches the feed gate.

3. A smelting furnace according to claim 2, wherein the preheating unit is substantially circular in horizontal section and narrows in the downward direction.

4. A smelting furnace according to claim 2, wherein the preheating unit comprises a chamber disposed above the feed gate and in open communication with the smelting zone, the horizontal sectional area of the chamber decreasing in the downward direction over at least part of its height.

5. A smelting furnace according to claim 2, wherein the supply means comprise a concentrate divider connected to the feed gate.

6. A smelting furnace according to claim 1, wherein the supply means comprise a concentrate divider connected to the feed gate.

7. A smelting furnace according to claim 1, comprising a preheating chamber disposed above the feed gate, duct means for recirculating a flow of exhaust gas from said discharge opening to the preheating chamber, and means for introducing feed material into the flow of gas through the duct means.

8. A smelting furnace according to claim 7, wherein the preheating chamber is substantially circular in horizontal section and the duct means open substantially tangentially into the preheating chamber, whereby the feed material is separated from the recirculated gas flow by cyclonic action.

9. A smelting furnace according to claim 7, wherein the preheating chamber is substantially circular in horizontal section and its horizontal sectional area decreases in the downward direction over at least a part of its height, the duct means open substantially tangentially into the preheating chamber, and the furnace further comprises a draft tube extending vertically downwardly into the preheating chamber for exhausting recirculated gas from the preheating chamber.

10. A method of operating a smelting furnace comprising wall means defining a smelting zone, said wall means including a floor and a roof, the roof defining a gate, at least three cathodes extending into the smelting zone through the roof and disposed at locations spaced apart around a circle, and an anode at the floor, said method comprising:
   supplying finely-divided feed material into a smelting zone bounded by the roof and the floor as an evenly dispersed gas-borne suspension over the cross-sectional area of the gate at a location within said circle, and discharging gas from the smelting zone through an opening in the roof outside said circle.

11. A method according to claim 10, comprising preheating the feed material before introducing it into the smelting zone.

12. A method according to claim 10, comprising introducing the feed material into the smelting zone in a substantially downward direction.

13. A method according to claim 10, comprising recirculating a portion of the discharged gas flow and suspending the feed material in the recirculating gas flow.

14. A method according to claim 13, comprising introducing the recirculated gas flow having the feed material suspended therein into a preheating chamber disposed above the smelting zone.

15. A method according to claim 14, wherein the preheating chamber is substantially circular in horizontal section and the method comprises introducing the recirculated gas flow into the preheating chamber in a substantially tangential direction.

* * * * *